Dec. 21, 1965     E. A. SHINER     3,224,885
METHOD OF PRODUCING CELLULOSIC SAUSAGE CASINGS
Filed Oct. 10, 1961
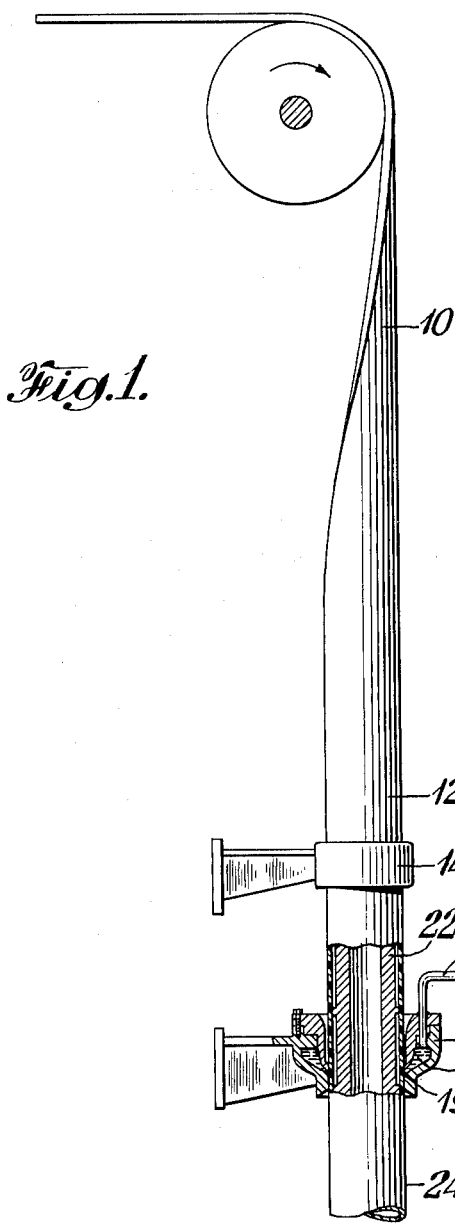
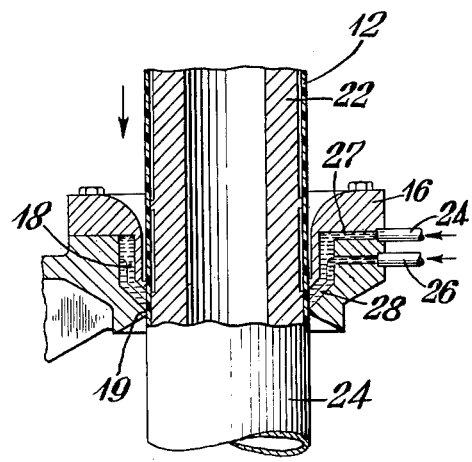
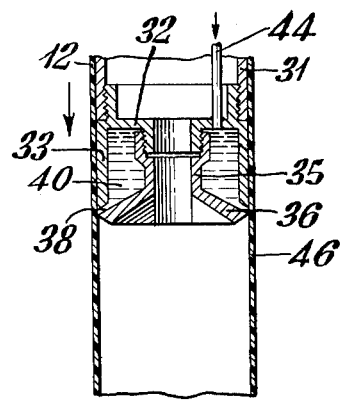
INVENTOR.
EDWARD A. SHINER
BY
ATTORNEY United States Patent Office 3,224,885
Patented Dec. 21, 1965

3,224,885
METHOD OF PRODUCING CELLULOSIC
SAUSAGE CASINGS
Edward A. Shiner, Chicago, Ill., assignor to Union Carbide Corporation, a corporation of New York
Filed Oct. 10, 1961, Ser. No. 144,196
4 Claims. (Cl. 99—176)

This invention relates to cellulosic sausage casings. It more particularly refers to cellulosic casings characterized by easy peelability from meat products encased therein and to a method of preparing such casings.

In making of sausages, a meat emulsion is stuffed into a cellulosic casing and then heated and smoked to produce a salable, edible product. The emulsions and the cooking cycles vary with the particular product being made, e.g., bologna, sausage, salami, summer sausage, dry sausage, thuringer, frankfurters, ham, Canadian bacon, butts, pork butts, picnic sausage and the like.

In many cases, the casing is desirably removed from the sausage after cooking and the product sold in the skinless form. In some cases, the casing is left on for the consumer to remove. In either of these two situations, it is desirable that the casing be removed from the cooked meat product with a minimum, and preferably no damage to the meat surface. This damage sometimes takes the form of meat adhering to the casing and being pulled out of the meat surface upon removal of the casing. This damage may range from slight scuffing to severe scarring of the surface depending upon the meat product, the peeling operation, and the particular casing used.

It is an object of this invention to provide a cellulosic sausage casing of uniform composition which is readily peelable from a processed meat product encased therein.

Additional objects will become evident as the description of the invention proceeds.

According to the present invention regenerated cellulose sausage casings characterized by peelability from meat products encased therein with little or no damage thereto are prepared by homogeneously incorporating in a viscose solution small amounts of a suitable ketene dimer or mixtures of such dimers as hereinafter described, extruding the mixture in a manner yielding a tubular structure, regenerating the cellulose in said tubing, washing the tubing to remove regeneration by-products therefrom, plasticizing the washed tubing with glycerine or equivalent polyhydric alcohol and then drying the plasticized tubing to a desired moisture content.

Ketene dimers effective for imparting easy peelability to regenerated, cellulose sausage casings are the dimers of aldoketenes having the formula:

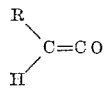

wherein R is an alkyl or alkenyl group having from 12 to 22 carbon atoms. Ketene dimers useful in the instant invention and encompassed by the above formula are represented by dodecyl ketene dimer, tetradecyl ketene dimer, hexadecyl ketene dimer, nondecyl ketene dimer, eiscosyl ketene dimer, dococyl ketene dimer, 7-hexadecenyl ketene dimer, 7-dodecynl ketene dimer and eicosenyl ketene dimer. A ketene dimer content between 0.1 and 10 percent by weight of the cellulose in the viscose is effective in imparting improved peelability.

The aldoketene dimer is added to the viscose and homogeneously admixed therewith prior to extrusion thereof and preferably within 10 minutes prior to extrusion. Prolonged contact of aldoketene dimers with alkaline viscose prior to regeneration can cause saponification of the ketene dimer and thereby inactivate it with respect to imparting peelability to the regenerated cellulose casing.

Inactivation of the ketene dimer in the viscose is avoided by rapid mixing together of the viscose and the ketene dimer followed by prompt extrusion and regeneration of the viscose. Preferably the viscose ketene dimer mixture is continuously prepared in a mixing apparatus capable of rapidly forming a homogeneous mixture before undesirable and unwanted changes occur as for example, gelation of the viscose caused by prolonged mixing and/or excessive heating of the mixture, or agglomeration of pigment matter when such is present to produce a colored regenerated cellulose. One form of mixing apparatus suitable for rapidly and continuously preparing and metering to suitable viscose extrustion and regenerating means a satisfactory viscose-ketene dimer mixture is the water-cooled mixer described in copending application Serial No. 846,868 filed October 16, 1959 now Patent No. 3,150,-862; said mixer comprising a cooling water-jacketed cylindrical mixing chamber having an individual inlet port for each liquid to be pressure fed into the chamber, all inlet ports being positioned at one end of the chamber, an outlet port at the other end of the chamber, and rotor means within the chamber to shear and mix together the liquids fed in the chamber from said inlet ports.

Ketenes, liquid at room temperature, can be mixed as such or in the form of aqueous emulsion with the viscose. Solid ketene dimers are preferably added to the viscose as an aqueous emulsion, the emulsion containing conventional emulsifying agents.

Suitable emulsifiers include the non-ionic emulsifiers such as ethylene oxide derivitives of the partial esters of polyhydric alcohols such as glycerine, sorbitan and the like as typified by polyoxyethylene derivatives of sorbitan monopalmitate; commercial soaps; and partial esters of polyhydric alcohols, e.g., sorbitan monopalmitate.

About about a 7% by weight ketene dimer concentration based on the cellulose, there is no significant further improvement in peelability. Moreover, cellulose casings containing such higher ketene dimer contents are apt to promote aesthetically undesirable surface fat pocket formations on certain meat products processed therein, as for example, bologna sausage emulsions. Those skilled in the art by using routine testing procedures including those hereinafter described, can readily determine the optimum quantity of ketene dimer desired for any specific cellulosic sausage casing construction and with regard to its intended meat processing use.

The principles of this invention are applicable to known cellulose sausage casing constructions such as the casings prepared by annularly extruding and regenerating a viscose solution to form continuous cellulosic tubing including, but not restricted to, the casing described in U.S. Patents 1,601,686 and 1,612,509. The invention also has utility in the manufacture of seamless casings reinforced with a fibrous web, as shown in U.S. Patents 2,105,273 and 2,144,900.

The preparation of cellulose casings having improved peelability from meat products can be readily accomplished by extruding and regenerating a homogeneous mixture of viscose solution and a suitable ketene dimer in accordance with conventional techniques, as by extruding the viscose composition through an annular orifice into an aqueous coagulating and regenerating bath containing sodium sulfate and sulfuric acid. Thereafter continuing the regeneration by successively passing the tubing through a series of tubs containing acid of sufficient strength to complete the regeneration, followed by immersion of the regenerated tubing into successive tubs of wash water to remove regeneration by-products from the tubing. The washed tubing is plasticized and then dried.

The production of fibrous reinforced cellulose casing from an aldoketene dimer containing viscose solution is schematically illustrated in the accompanying drawing wherein:

FIGURE 1 is a vertical elevational view, partly in section schematically showing apparatus suitable for forming fibrous reinforced cellulosic tubing by impregnating paper tubing through its outer wall with a viscose solution containing a ketene dimer;

FIGURE 2 is a broken vertical sectional view of an alternative means for sequentially impregnating fibrous tubing through its outer wall with more than one viscose solution; and FIGURE 3 is a broken vertical sectional view of means for impregnating paper tubing through its inner wall with a ketene dimer containing viscose solution.

Referring now to FIGURE 1, a porous fibrous web 10 such as cellulosic paper from a supply source not shown is continuously fed over a guide roll. The web is then curved along its longitudinal margins are overlapped to form a cylindrical tube 12. The overlapped margins are preferably secured together by the application to the marginal surfaces of a suitable adhesive paste, as for example viscose. The tubing then passes through a supported forming ring 14 and over a supported cylindrical mandrel 22, extending downwardly through an externally supported viscose extrusion means 16. Viscose containing a ketene dimer is continuously supplied under pressure to an annular chamber 18 in said extrusion means 16 from a supply pipe 20 connected thereto. The viscose flows from chamber 18 to an annular orifice 19 and fully impregnates the paper tubing 12 as it moves past said orifice, and concurrently is deposited as an exterior coating on the tubing. The viscose impregnated and coated tubing 24 is then passed through conventional precipitating and regenerating baths to regenerate the cellulose which forms at seamless matrix in which the reinforcing paper fibers of the paper web are uniformly imbedded. The regenerated fiber reinforced cellulosic tubing is then washed in water baths, plasticized with a suitable polyhydric alcohol and then dried.

FIGURE 2 shows an annular viscose extrusion means generally indicated as 16 and similar to that illustrated in FIGURE 1 but provided with an upper viscose supply pipe 24, and a lower viscose supply pipe 26 for supplying two viscose streams under pressure to the annular chamber 18 and orifice 19. Viscoses entering the chamber from supply pipes 24 and 26 flow as a bilayer stream onto the exterior surface of the paper tubing 12. The viscosities and flow rates of the two viscose streams 27, 28 are so controlled that essentially laminar flow conditions prevail in the annular chamber 18 and orifice 19 whereby no significant commingling occurs of the two streams. The upper viscose stream 27 contains a ketene dimer and the lower viscose stream 28 is free from ketene dimer whereby a more economical use is obtained of the ketene dimer component in as much as the upper viscose stream 27 penetrates the porous tubing and deposits on the inner wall (normally in contact with the meat product) a continuous viscose surface which upon regeneration has excellent peelability from cooked meat products. The lower viscose stream 28 (free from ketene dimer) is deposited as a continuous coating on the tubing's outer surface.

The embodiment of the viscose extrusion-impregnating means illustrated in FIGURE 3 is particularly adapted for interiorly impregnating fibrous, porous tubing with a ketene dimer containing viscose solution. Paper tubing or the like porous tubing 12 is conveyed (by means not shown) downwardly over a cylindrical mandrel 31; a circular plug 32 having a depending circular skirt portion 33 is attached by screw threads to the terminal portion of the mandrel 31. A spool shaped core piece 35 is threadably attached to and suspended from a central boss of plug 32. The core 35 has a conical flange 36 coacting with the terminal edge of skirt 33 to form an annular extrusion orifice 38 and an annular chamber 40. Ketene dimer containing viscose is supplied under pressure to chamber 40 through a supply pipe 44. The screw attachment of core piece 35 to plug 32 provides a precise means for adjusting the width of the orifice 38. As the porous tubing 12 passes over the orifice 38, it is completely impregnated with viscose. The impregnated tubing 46 is then passed through conventional regenerating and washing vats to regenerate the cellulose in the viscose impregnant and coating.

Alternatively, the paper tubing can be initially exteriorly impregnated with an unmodified viscose as for example by apparatus shown in FIGURE 1, and then interiorly impregnated and coated with a ketene dimer containing viscose using apparatus as illustrated in FIGURE 3.

A porous, bibulous paper formed of hemp fibers bonded together with regenerated cellulose is preferred as the reinforcing web material 10 in the manufacture of fibrous reinforced cellulosic casings from ketene-dimer containing viscose. Other non-woven cellulosic webs such as yoshino paper, rice paper and cotton rag paper can be used. Non-woven webs made from synthetic polymer fibers as for example nylon, polyethylene and the like are also useful in the practice of this invention, as well as woven fabrics such as for example muslin, cheese cloth, marquisette, organdy and foile of synthetic fibers or of natural fibers such as cotton, flax, hemp and the like.

The examples hereinafter set forth are merely illustrative embodiments of the nature of the invention, it being understood that the scope of the invention is not restricted thereto.

In each of the following examples the paper web employed as the fibrous reinforcement was a bibulous paper formed of hemp fibers bonded together with regenerated cellulose. The paper web formed into a tube with viscose pasted overlapping marginal edges was impregnated and coated in each instance with an aqueous viscose composition containing 7% by weight of regeneratable cellulose, 6% by weight of sodium hydroxide and different amounts of a mixture of ketene dimers.

The ketene dimer containing viscose compositions were all extruded on the paper web within about 10 minutes after the viscose and the dimer had been homogeneously mixed. The tube after impregnation and coating with the viscose was passed through a conventional aqueous coagulating and regenerating bath containing sodium sulfate, sulfuric acid and ammonium sulfate. The resultant regenerated cellulose tubing was washed, plasticized and dried according to procedures known to those skilled in the art as exemplified by Smith, U.S. Patent 2,144,900.

EXAMPLES 1 TO 4

Porous hemp paper was curved about its longitudinal axis to form a tube with overlapping viscose pasted longitudinal margins. The tube was impregnated with viscose compositions containing different amounts of a ketene dimer mixture of equal parts by weight of hexadecyl ketene dimer and tetradecyl ketene dimer. The viscose compositions were applied to the external tubing surface by means of an annular viscose extrusion means 16 as schematically illustrated in FIGURE 1 and forced through the porous paper walls whereby the paper tubing was fully impregnated with viscose. Regeneration of the cellulose in the viscose impregment was effected by passing the viscose impregnated tubing through an aqueous regenerating bath. The resultant fibrous reinforced regenerated cellulose casing was water-washed, glycerinated and then dried in a continuous manner.

The dried casings were stuffed with a bologna meat emulsion of veal, pork, beef, dried skim milk powder, salt, spices, sodium nitrate, and sodium nitrite and then processed as known in the art by heating and smoking to an internal temperature of 147° F. to 150° F. After smoking, the encased sausages were showered with hot water and then showered with cold water. The sausages were stored overnight at 30° F.

The force required to strip the fibrous reinforced cellulosic casings from the sausage meat surface was determined by making two cuts in the casing, 1″ apart, parallel to the longitudinal axis of the sausage and measuring the amount of force in pounds necessary to pull the 1″ wide strip from the sausage. This was done by making a third cut perpendicularly across the two parallel cuts, freeing a segment of the strip of casing and measuring the average force necessary to pull the rest of the 1″ strip from the sausage with a spring loaded scale hooked to the casing with an alligator clip. A measure of this force is an indication of the tendency for the casing to adhere to the meat mass.

The stripping test described supra was employed to evaluate the fibrous casings described in Examples 1 to 4, and the test data is set forth in the subsequent table.

*Table I*

| Example No. | Ketene dimers content | Stripping Force in pounds to peel inner casing surface from meat surface |
| --- | --- | --- |
| 1 | 0.0 | 0.82 |
| 2 | 1.1 | 0.74 |
| 3 | 2.2 | 0.54 |
| 4 | 4.4 | 0.28 |

The content of ketene dimers incorporated into the viscose is based on percent by weight of ketene dimers to the bone dry cellulose in the viscose.

EXAMPLES 5 TO 11

Tubing formed from porous hemp fiber paper was fully impregnated with viscose compositions containing different amounts of the ketene dimer mixture described in Examples 1 to 4, and exteriorly coated with an overlay of the same basic viscose composition but free from ketene dimer using impregnation apparatus as shematically illustrated in FIGURE 2. The ketene dimer containing viscose supplied to the extrusion chamber 18 and flowing therefrom in an annular stream 27 onto the exterior surface of the paper tubing fully impregnated the paper tubing. Concurrently an annular stream 28 of viscose composition free from ketene dimer was sequentially applied to the exterior tubing surface forming an exterior viscose overlay coating. The viscose impregnated tubing was then passed through regenerating and wash vats, plasticized and dried according to conventional procedures. The amount of each viscose composition deposited in and on the tubing was controlled by the use of positive displacement pumps metering the desired amount of each viscose stream 27, 28, whereby as in Examples 6, 8, and 10, the underlayer of ketene dimer containing viscose constituted 28.2 weight percent of the total viscose deposited by both streams in and on the tubing, and 50.2 weight percent as in Examples 7, 9, and 11. Example 5 is a control fibrous tubing made under the same conditions with the exception that both viscose streams 27, 28 contained no ketene dimer. Each of the dried casings were stuffed and processed with the meat emulsion as described in Examples 1 to 4. After hot water washing and subsequent cold water showering, one group of fibrous casing encased sausage products was stored overnight at 25° F. and another group at 30° F. Peeling tests were conducted on the sausage products and subsequent Table II presents the test data in tabulated form.

*Table II*

| Example No. | Ketene dimers content of viscose underlayer | Percent by weight of viscose in the underlayer | Stripping Force in pounds | |
| --- | --- | --- | --- | --- |
| | | | At 30° F. | At 25° F. |
| 5 | 0.0 | | 0.79 | 0.79 |
| 6 | 2.61 | 28.2 | 0.70 | 0.69 |
| 7 | 2.61 | 50.2 | 0.68 | 0.63 |
| 8 | 4.30 | 28.2 | 0.69 | 0.64 |
| 9 | 4.30 | 50.2 | 0.63 | 0.59 |
| 10 | 6.95 | 28.2 | 0.43 | 0.46 |
| 11 | 6.95 | 50.2 | 0.28 | 0.22 |

The content of ketene dimer incorporated in the viscose is based on percent by weight of ketene dimers to the bone dry cellulose in the viscose.

EXAMPLES 12 to 15

A hemp paper web as used in the previous examples was formed into a tube by overlapping and viscose pasting together the longitudinal marginal edges. The paper tubing was exteriorly coated and impregnated with an unmodified viscose composition containing 7 weight percent cellulose and 6 weight percent sodium hydroxide by being passed through a coating extrusion means as specifically illustrated in FIGURE 1. The exteriorly viscose coated tubes were then interiorly coated and impregnated with viscose compositions containing different amounts of the ketene dimer mixture of Examples 1 to 11 by being conducted downwardly over an extrusion means such as illustrated in FIGURE 3. The viscose coated fibrous tubings were then passed through conventional regenerating and water washing baths, plasticized with glycerine and then dried. The dried fibrous reinforced cellulose casings were stuffed with mean emulsions and processed as described in Examples 1 to 4. Peelability of the casings from the meat surface after overnight storage at 30° F. was measured by the same technique previously described, the data being presented in the subsequent table.

No scarring of the meat surfaces occurred in any of the peel tests of the casings described in the examples made from ketene dimer containing viscoses, whereas the control casings of Examples 1, 5, and 12 could not be peeled without causing some scarring of the meat surface.

*Table III*

| Example No. | Ketene dimers content | Stripping Force in pounds to peel inner casing surface from meat surface |
| --- | --- | --- |
| 12 | 0.0 | 0.48 |
| 13 | 3.0 | 0.19 |
| 14 | 5.0 | 0.07 |
| 15 | 7.0 | 0.06 |

The content of ketene dimers incorporated into the viscose is based on percent by weight of ketene dimers to the bone dry cellulose in the viscose The tensile strength, transparency, elasticity and moisture permeability of regenerated cellulose casings are substantially unchanged by the incorporation of the ketene dimer in the viscose as described herein.

The sausage casing produced by the methods described herein are admirably suited for the use in processing and packaging of meat products such as sausages and processed meats such as bologna, bear sausage, salami, summer sausage, dry sausage, thuringer, frankfurter, hams, Canadian bacon, butts, pork butts, picnic sausage, and the like. The casings can also be used for products other than meat products such as cheese and other food products which require processing or distribution in casings. "Skinless" frankfurters may also be produced by using the casings of the present invention, and using the methods in which the frankfurters are processed by smoking and heating and then removing the casing from the cured frankfurter. Alternatively the cured frankfurter may be distributed to the ultimate consumer before removing the casing of this invention. The reduced adhesion of the casing to the frankfurter permits the consumer to peel off the casings without scarring the surface of the meat.

What is claimed is:

1. Method for producing cellulosic sausage casings characterized by easy peelability from the sausage surface which comprises dispersing in viscose, in an amount from about 0.1 percent to 10 percent by weight of the cellulose in said viscose, at least one dimer of a ketene having the formula:

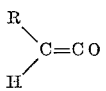

wherein R is selected from the group consisting of alkyl and alkenyl radicals containing from 12 to 22 carbon atoms inclusive, within a time insufficient to cause saponification of the ketene dimer annularly extruding the ketene dimer containing viscose composition to form continuous tubing and regenerating the cellulose in said tubing.

2. The method as claimed in claim 1 wherein the viscose contains a mixture of hexadecyl ketene dimer and tetradecyl ketene dimer.

3. The method as claimed in claim 1 wherein a tubular fibrous web is embedded in the viscose as it is extruded.

4. Method of producing fibrous reinforced cellulosic sausage casings characterized by easy peelability from the sausage surface which comprises dispersing in viscose in an amount from about 0.1 percent to 10 percent by weight of the cellulose in said viscose, at least one dimer of a ketene having the formula:

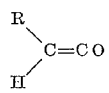

wherein R is selected from the group consisting of alkyl and alkenyl radicals containing from 12 to 22 carbon atoms inclusive, impregnating porous, fibrous tubing with the ketene dimer containing viscose composition by extruding a stream of the ketene dimer containing viscose composition onto the exterior surface of the fibrous tubing, sequentially extruding a stream of viscose free from ketene dimer onto the exterior surface of the impregnated tubing, and regenerating the viscose of the tubing within a time insufficient to cause saponification of the ketene dimer.

References Cited by the Examiner
UNITED STATES PATENTS 2,627,477  2/1953  Downey _____ 106—170
3,106,471  10/1963  Firth _____ 99—109

FOREIGN PATENTS 604,475  8/1960  Canada.

A. LOUIS MONACELL, *Primary Examiner.*

ABRAHAM H. WINKELSTEIN, HYMAN LORD,
*Examiners.*